United States Patent
Craig et al.

(10) Patent No.: US 12,137,631 B2
(45) Date of Patent: Nov. 12, 2024

(54) RESIDUE MANAGEMENT CONTROL SYSTEM FOR HARVESTER

(71) Applicant: DEERE & COMPANY, Moline, IL (US)

(72) Inventors: Paul I. Craig, Thibodaux, LA (US); Bryan E. Dugas, Napoleonville, LA (US)

(73) Assignee: DEERE & COMPANY, Moline, IL (US)

(*) Notice: Subject to any disclaimer, the term of this patent is extended or adjusted under 35 U.S.C. 154(b) by 109 days.

(21) Appl. No.: 17/156,176

(22) Filed: Jan. 22, 2021

(65) Prior Publication Data

US 2022/0232772 A1 Jul. 28, 2022

(51) Int. Cl.
| | |
|---|---|
| *A01D 45/10* | (2006.01) |
| *A01D 41/127* | (2006.01) |
| *A01D 43/08* | (2006.01) |
| *A01D 65/04* | (2006.01) |

(52) U.S. Cl.
CPC ....... *A01D 43/087* (2013.01); *A01D 41/1276* (2013.01); *A01D 45/10* (2013.01); *A01D 65/04* (2013.01)

(58) Field of Classification Search
CPC ...... A01D 45/10; A01D 43/07; A01D 43/073; A01D 43/087; A01D 57/22; A01D 75/00; A01D 41/00–41/16
See application file for complete search history.

(56) References Cited

U.S. PATENT DOCUMENTS

| | | | |
|---|---|---|---|
| 537,690 | A | 4/1895 | Landis |
| 623,109 | A | 4/1899 | Schuman |
| 970,956 | A | 9/1910 | Ruddell |
| 1,031,472 | A | 7/1912 | Schubert |
| 1,847,433 | A | 3/1932 | Krause |
| 2,092,134 | A | 9/1937 | Oppenheim |
| 4,155,602 | A | 5/1979 | Quick |
| 4,270,337 | A | 6/1981 | Pinto |
| 4,295,325 | A | 10/1981 | Cannavan |
| 4,555,896 | A | 12/1985 | Stiff et al. |

(Continued)

FOREIGN PATENT DOCUMENTS

| | | | |
|---|---|---|---|
| CN | 103563556 A | * | 2/2014 |
| DE | 102019004647 A1 | | 3/2018 |

(Continued)

*Primary Examiner* — Adam J Behrens
*Assistant Examiner* — Madeline I Runco
(74) *Attorney, Agent, or Firm* — Michael Best & Friedrich LLP

(57) ABSTRACT

A control system for a harvester having a residue discharge system operable to eject crop residue according to an adjustable residue discharge parameter, the control system including a processor, a memory, a human-machine interface, and a sensor configured to detect at least one of wind speed, wind direction, or humidity. The control system is configured to receive the signal from the sensor, receive an operator input corresponding to a desired residue management strategy selected from at least a first residue management strategy and a second residue management strategy, and adjust the residue discharge parameter based on the desired residue management strategy and the detected at least one of wind speed, wind direction, or humidity.

11 Claims, 7 Drawing Sheets

(56) References Cited

U.S. PATENT DOCUMENTS

| | | |
|---|---|---|
| 5,031,392 A | 7/1991 | Baker |
| 5,092,110 A | 3/1992 | Dommert et al. |
| 5,129,219 A | 7/1992 | Baker |
| 5,167,581 A | 12/1992 | Haag |
| 5,379,578 A | 1/1995 | Landry et al. |
| 5,488,820 A | 2/1996 | Cannavan |
| 5,558,282 A | 9/1996 | Ameye et al. |
| 6,272,819 B1 | 8/2001 | Wendte et al. |
| 6,363,700 B1 | 4/2002 | Fowler |
| 6,497,546 B2 | 12/2002 | Wood et al. |
| 6,974,021 B1 | 12/2005 | Boevers |
| 7,195,557 B2 | 3/2007 | Hettiger |
| 8,682,540 B2 | 3/2014 | Missotten et al. |
| 8,924,030 B2 | 12/2014 | Wendte et al. |
| 9,084,393 B1 | 7/2015 | Singleton |
| 9,456,547 B2 | 10/2016 | Cazenave et al. |
| 9,702,753 B2 | 7/2017 | Johnson et al. |
| 9,788,485 B2 | 10/2017 | Craig et al. |
| 10,091,934 B2 | 10/2018 | Dugas et al. |
| 10,317,272 B2 | 6/2019 | Bhavsar et al. |
| 10,412,888 B2 | 9/2019 | Matway et al. |
| 10,645,876 B2* | 5/2020 | Dugas .................... A01D 45/10 |
| 10,806,079 B2* | 10/2020 | Gunda .................. A01D 43/087 |
| 10,959,376 B2 | 3/2021 | Pereira et al. |
| 11,224,170 B2 | 1/2022 | Dighton et al. |
| 2004/0053653 A1 | 3/2004 | Isfort et al. |
| 2004/0224735 A1 | 11/2004 | Hinds |
| 2005/0016145 A1 | 1/2005 | Huff, Jr. |
| 2007/0135935 A1 | 6/2007 | Maertens et al. |
| 2009/0017885 A1* | 1/2009 | Halls .................... A01F 25/04 460/59 |
| 2009/0272619 A1 | 11/2009 | Leal et al. |
| 2011/0307149 A1 | 12/2011 | Pighi et al. |
| 2012/0024670 A1 | 2/2012 | Koerselman et al. |
| 2012/0110969 A1 | 5/2012 | Hinds |
| 2013/0095899 A1 | 4/2013 | Knapp |
| 2013/0145940 A1 | 6/2013 | Roberge et al. |
| 2013/0251484 A1 | 9/2013 | Wood et al. |
| 2014/0128134 A1 | 5/2014 | Linde |
| 2014/0295923 A1* | 10/2014 | Vergote .................. A01D 45/10 460/98 |
| 2015/0327438 A1 | 11/2015 | Cazenave et al. |
| 2016/0057927 A1 | 3/2016 | Bojsen et al. |
| 2016/0088794 A1* | 3/2016 | Baumgarten ...... A01D 41/1243 460/1 |
| 2016/0252384 A1 | 9/2016 | Wilson et al. |
| 2017/0042088 A1 | 2/2017 | Nykamp et al. |
| 2017/0055446 A1 | 3/2017 | Nykamp et al. |
| 2017/0086372 A1* | 3/2017 | Palla .................. A01D 41/1243 |
| 2017/0112058 A1 | 4/2017 | Craig et al. |
| 2017/0112063 A1 | 4/2017 | Craig |
| 2017/0325402 A1 | 11/2017 | Craig |
| 2018/0084718 A1* | 3/2018 | Baumgarten ...... A01D 41/1243 |
| 2018/0116114 A1* | 5/2018 | Craig .................... A01D 45/10 |
| 2019/0037770 A1* | 2/2019 | Dugas .................. A01F 12/444 |
| 2019/0183052 A1 | 6/2019 | Craig et al. |
| 2019/0230856 A1 | 8/2019 | Dighton et al. |
| 2019/0261564 A1* | 8/2019 | Gunda .................. A01D 45/10 |
| 2019/0350136 A1 | 11/2019 | Craig |
| 2020/0077591 A1 | 3/2020 | Xu et al. |
| 2020/0137958 A1 | 5/2020 | Hansen et al. |
| 2020/0404842 A1 | 12/2020 | Dugas et al. |
| 2021/0084820 A1 | 3/2021 | Vandike et al. |
| 2021/0112714 A1 | 4/2021 | Murray et al. |
| 2021/0195840 A1 | 7/2021 | Puryk et al. |
| 2021/0315161 A1 | 10/2021 | Pereira et al. |
| 2021/0329840 A1 | 10/2021 | Craig |
| 2021/0400870 A1* | 12/2021 | Sunil .................... A01F 12/40 |
| 2022/0232768 A1 | 7/2022 | Craig |
| 2023/0028281 A1* | 1/2023 | Lorriette ............. A01D 41/127 |

FOREIGN PATENT DOCUMENTS

| | | | |
|---|---|---|---|
| DE | 102018202323 A1 | 8/2019 | |
| DE | 102016116043 A1 | 1/2021 | |
| EP | 1408732 B1 | 3/2007 | |
| EP | 2241175 A1 | 10/2010 | |
| FR | 2334285 A | 7/1977 | |
| GB | 2517049 A | 2/2015 | |
| JP | H10215633 A | 8/1998 | |
| WO | 2000032026 A1 | 6/2000 | |
| WO | 2017187249 A1 | 2/2017 | |
| WO | WO-2017094588 A1 * | 6/2017 | ............. A01D 45/10 |
| WO | WO-2018037542 A1 * | 3/2018 | ............. A01D 45/10 |
| WO | WO-2018037543 A1 * | 3/2018 | ............. A01D 45/10 |
| WO | 2019220815 A1 | 8/2018 | |
| WO | 2018142768 A1 | 11/2019 | |
| WO | WO-2021049476 A1 * | 3/2021 | |
| WO | WO-2022137791 A1 * | 6/2022 | |

* cited by examiner

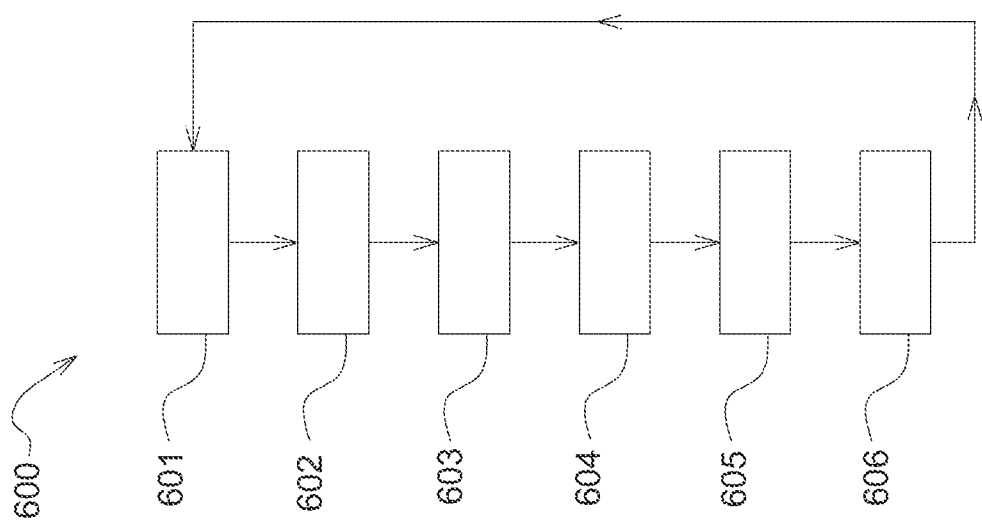

RESIDUE MANAGEMENT CONTROL SYSTEM FOR HARVESTER

BACKGROUND

The present disclosure relates to a harvester for harvesting material.

SUMMARY

In one aspect, the disclosure provides a control system for a harvester having a residue discharge system operable to eject crop residue according to an adjustable residue discharge parameter, the control system including a processor, a memory, a human-machine interface, and a sensor configured to detect at least one of wind speed, wind direction, or humidity. The control system is configured to receive the signal from the sensor, receive an operator input corresponding to a desired residue management strategy selected from at least a first residue management strategy and a second residue management strategy, and adjust the residue discharge parameter based on the desired residue management strategy and the detected at least one of wind speed, wind direction, or humidity.

In another aspect, the disclosure provides a harvester. The harvester includes an inlet configured to receive crop, a blade configured to cut the crop into billet and extraneous plant matter, and a cleaning system. The cleaning system is configured to generally distinguish between billet and extraneous plant matter such that billet is directed to a conveyor configured for discharging billet to a vehicle and extraneous plant matter is ejected through a hood as residue, wherein the hood is movable to control a direction of residue ejection. The harvester also includes a sensor configured to detect at least one of wind speed, wind direction, or humidity. The harvester also includes a control system including a processor, a memory, and a human-machine interface. The control system is configured to receive the signal from the sensor and programmed to move the hood based on the detected at least one of wind speed, wind direction, or humidity.

In another aspect, the disclosure provides a harvester. The harvester includes an inlet configured to receive crop, a blade configured to cut the crop into billet and extraneous plant matter, and a cleaning system. The cleaning system is configured to generally distinguish between billet and extraneous plant matter such that extraneous plant matter is ejected from the harvester as residue and billet is directed to a conveyor configured to discharge billet to a vehicle. A residue discharge rate is adjustable. The harvester also includes a sensor configured to detect at least one of wind speed, wind direction, or humidity. The harvester also includes a control system including a processor, a memory, and a human-machine interface. The control system is configured to receive the signal from the sensor and programmed to adjust the residue discharge rate based on the detected at least one of wind speed, wind direction, or humidity.

Other aspects of the disclosure will become apparent by consideration of the detailed description and accompanying drawings.

BRIEF DESCRIPTION OF THE DRAWINGS

FIG. 7 is a flow chart illustrating one mode of operation of the harvester of FIG. 1.

DETAILED DESCRIPTION

Before any implementations of the disclosure are explained in detail, it is to be understood that the disclosure is not limited in its application to the details of construction and the arrangement of components set forth in the following description or illustrated in the following drawings. The disclosure is capable of supporting other implementations and of being practiced or of being carried out in various ways.

Figure 1:
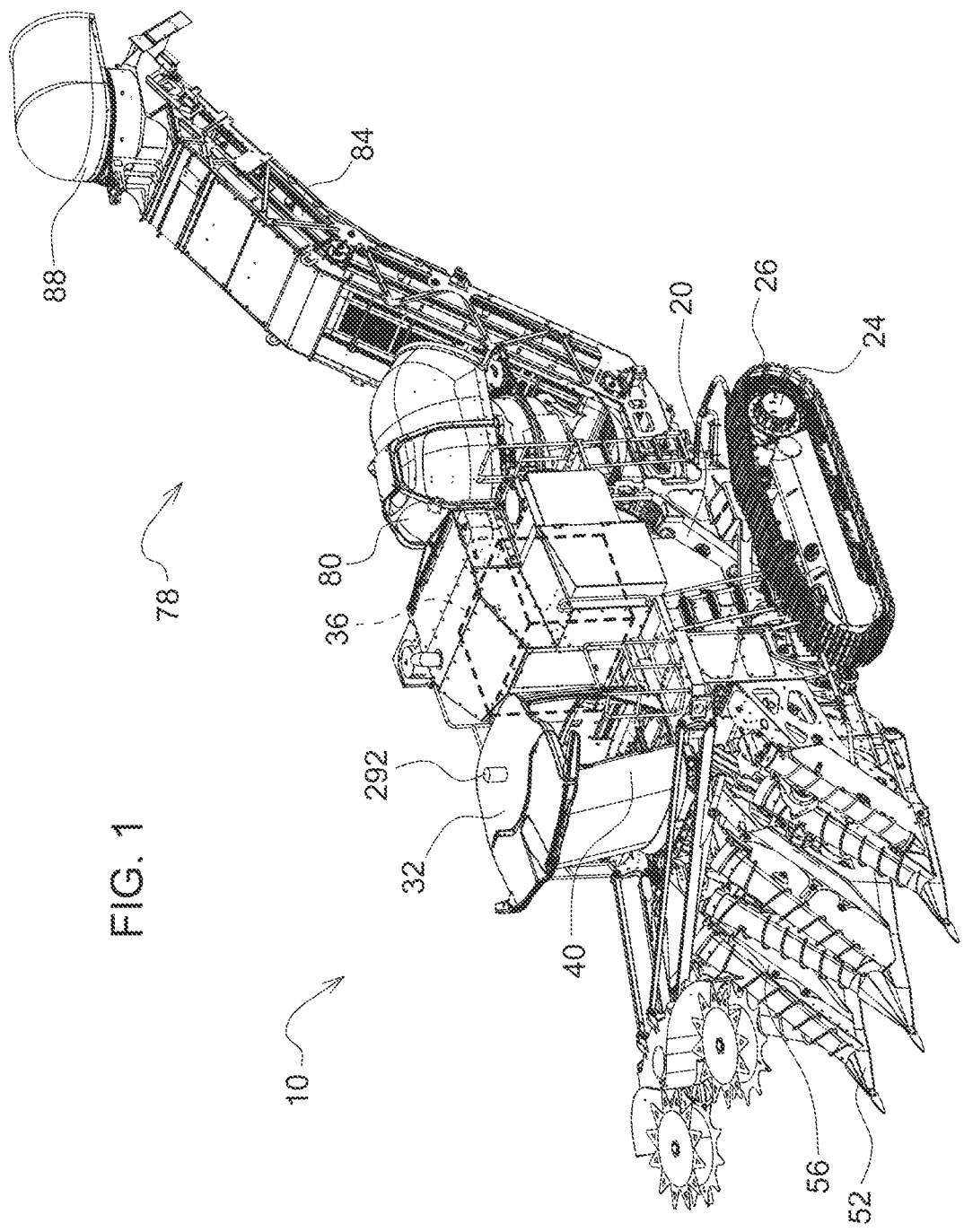
FIG. 1 is a perspective view of a harvester.
Figure 2:
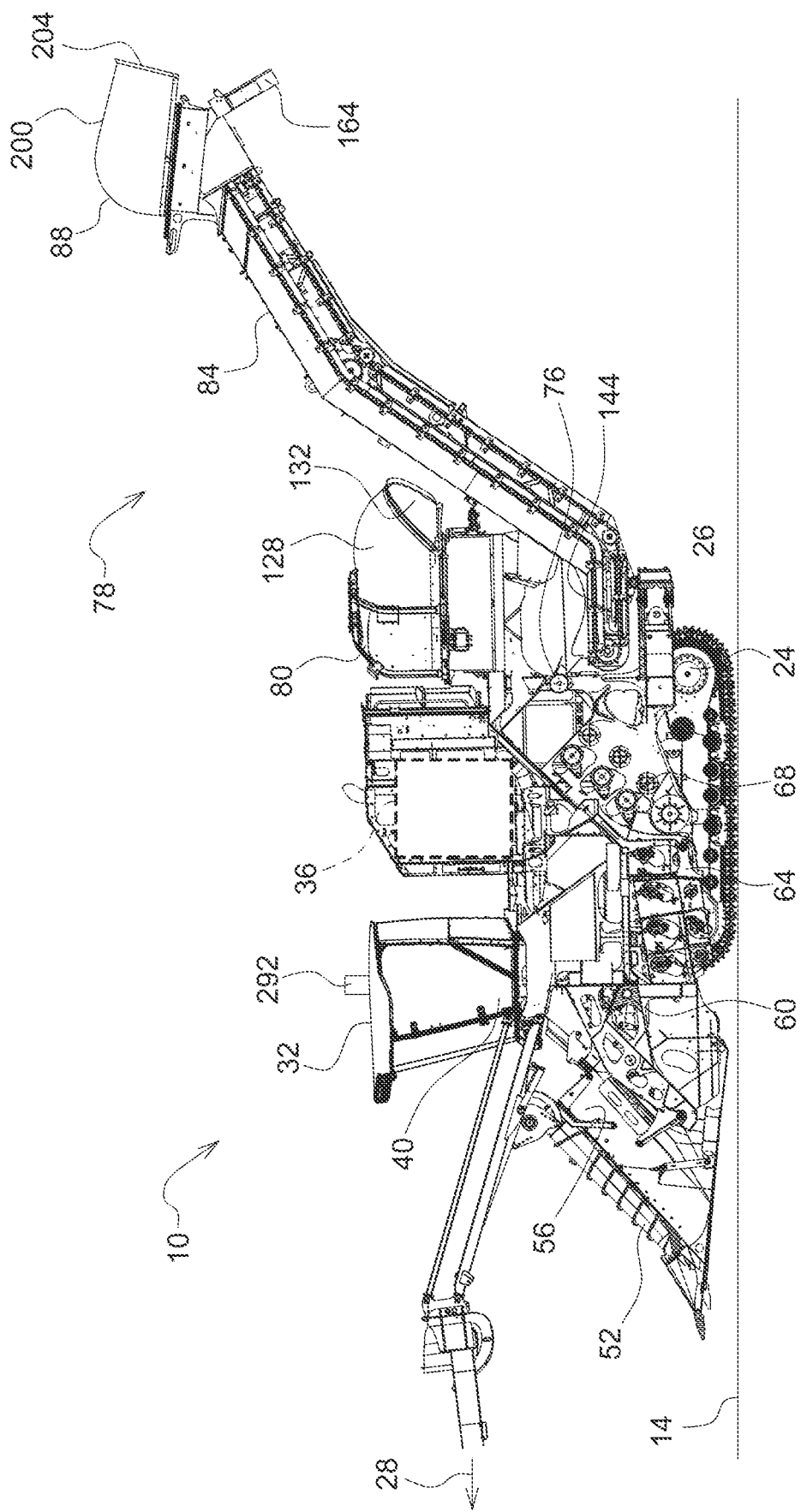
FIG. 2 is a side view of the harvester of FIG. 1 with portions removed.

FIG. 1 illustrates a harvester 10, such as a sugarcane harvester, configured to harvest crop from a field 14 and a vehicle 16 (FIG. 4) for retaining the harvested crop. The illustrated harvester 10 includes a main frame 20 supported on wheels 24 that engage the field 14 in order to move the harvester 10 across the field 14 in a direction of travel 28 (FIG. 2). In some implementations, the wheels 24 may include continuous tracks 26 or other traction devices. An operator's cab 32 is mounted on the frame 20 above a prime mover 36, such as an engine. The prime mover 36 may be an internal combustion engine or other such device for providing motive power. The harvester 10 includes a throttle 40 for controlling a speed of the prime mover 36 and thus a speed of the harvester 10 (also referred to as the harvester speed). Adjacent the prime mover 36 is a heat exchange area 44. The harvester 10 includes a pair of crop lifters 52 mounted to the front of the frame 20, defining an inlet 56 for receiving the crop.

FIG. 2 illustrates a side view of the harvester 10 with portions removed. The crop lifters 52 cooperate with a knockdown roller 60 and a base cutter 64 to remove the crop from the field 14. Feed rollers 68 feed the crop from the field 14 into the harvester 10. The feed rollers 68 operate at a feed speed. The harvester 10 further includes a chopper 76, and a cleaning system 78 (also referred to herein as residue discharge system) including a primary separator 80 and/or a secondary separator 88. The harvester 10 also includes a conveyor 84 (also referred to herein as an elevator) connecting the primary separator 80 and the secondary separator 88.

Figure 3:
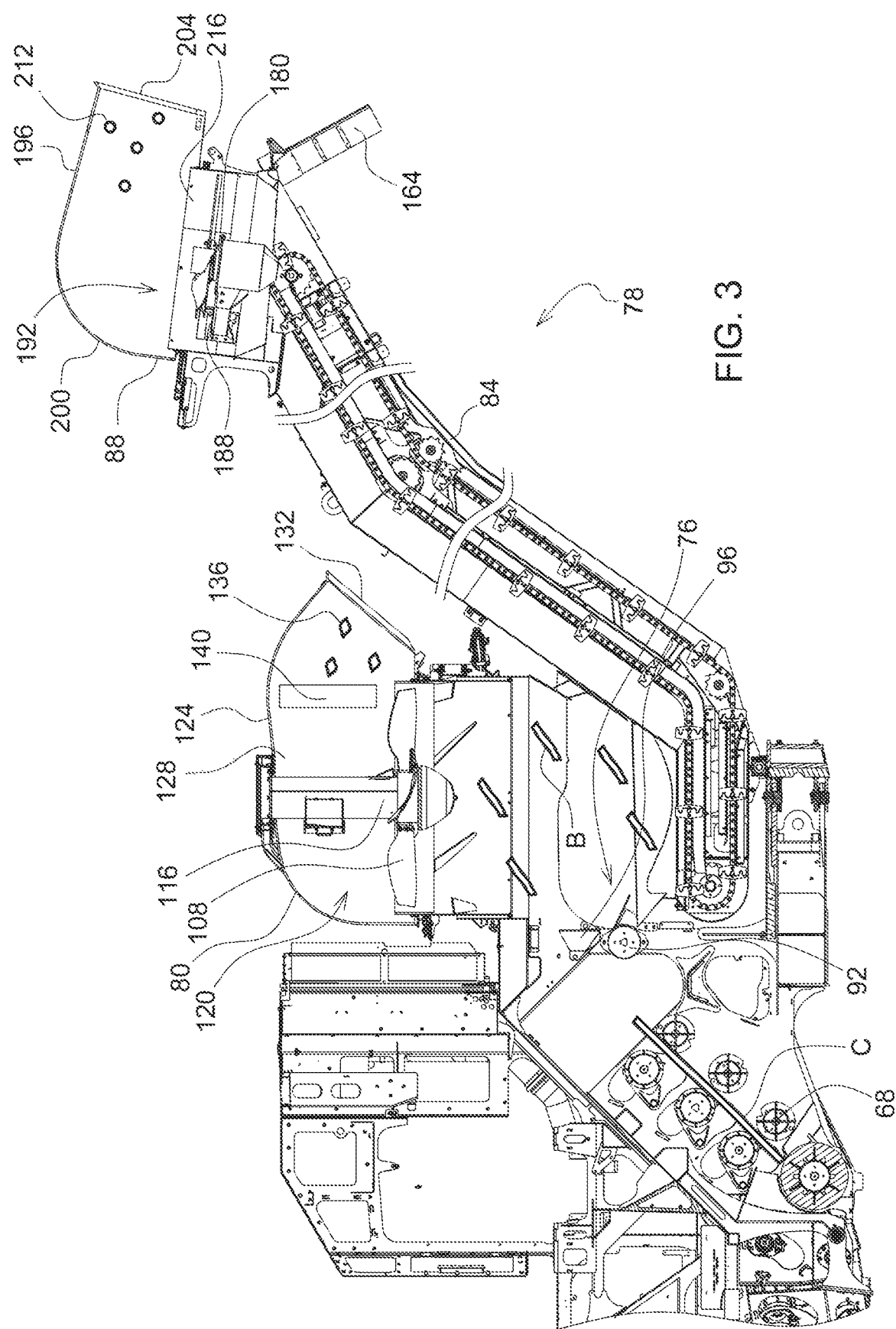
FIG. 3 is a partial cross sectional side view of the harvester of FIG. 1.

FIG. 3 illustrates the chopper 76 and the cleaning system 78 in more detail. The chopper 76 is disposed adjacent the feed rollers 68 to cut the crop. The chopper 76 may include a set of chopper drums 92 driven by a motor. The chopper drums 92 include a blade 96 for cutting the stalks of the crop. In one implementation, the chopper 76 may include counter rotating drum cutters with overlapping blades. In other implementations, the chopper 76 may include any suitable blade or blades for cutting the stalks of crop. The chopper 76 cuts the stalks of crop, referred to as cane C, into crop billet B, which includes pieces of the stalk. The crop also includes dirt, leaves, roots, and other plant matter, which is collectively referred to herein as extraneous plant matter. The chopper 76 operates at a chopper speed, which may be adjusted to change a size and weight of the resulting chopped crop pieces. The chopper 76 directs a stream of the cut crop, including crop billet B and extraneous plant matter, to the cleaning system 78 and specifically to the primary separator 80.

The cleaning system 78 is generally configured to distinguish between the billet B and the extraneous plant matter. (The extraneous plant matter may be referred to herein as residue, especially when ejected from the cleaning system 78.) The cleaning system 78 is generally operable at an adjustable cleaning speed. The primary separator 80 is coupled to the frame 20 and disposed downstream of the chopper 76 for receiving cut crop from the chopper 76. The primary separator 80 generally separates the extraneous plant matter from the crop billet B by way of any suitable mechanism for cleaning the cut crop, such as a fan, a source of compressed air, a rake, a shaker, or any other mechanism that distinguishes various types of crop parts by weight, size, shape, etc. in order to separate extraneous plant matter from crop billet. In the illustrated implementation, the primary separator 80 includes a primary fan 108 driven at a primary fan speed by a primary motor 116. The primary fan speed can be varied by controlling the primary motor 116. Thus, in the illustrated implementation, the cleaning speed may include the primary fan speed; however in other implementations, the cleaning speed may include air speed (e.g., of released compressed air or any other pressurized air), rake speed, shaker speed, etc. The primary separator 80 further includes a primary cleaning chamber 120 generally defined by a primary cleaner housing 124.

Figure 4:
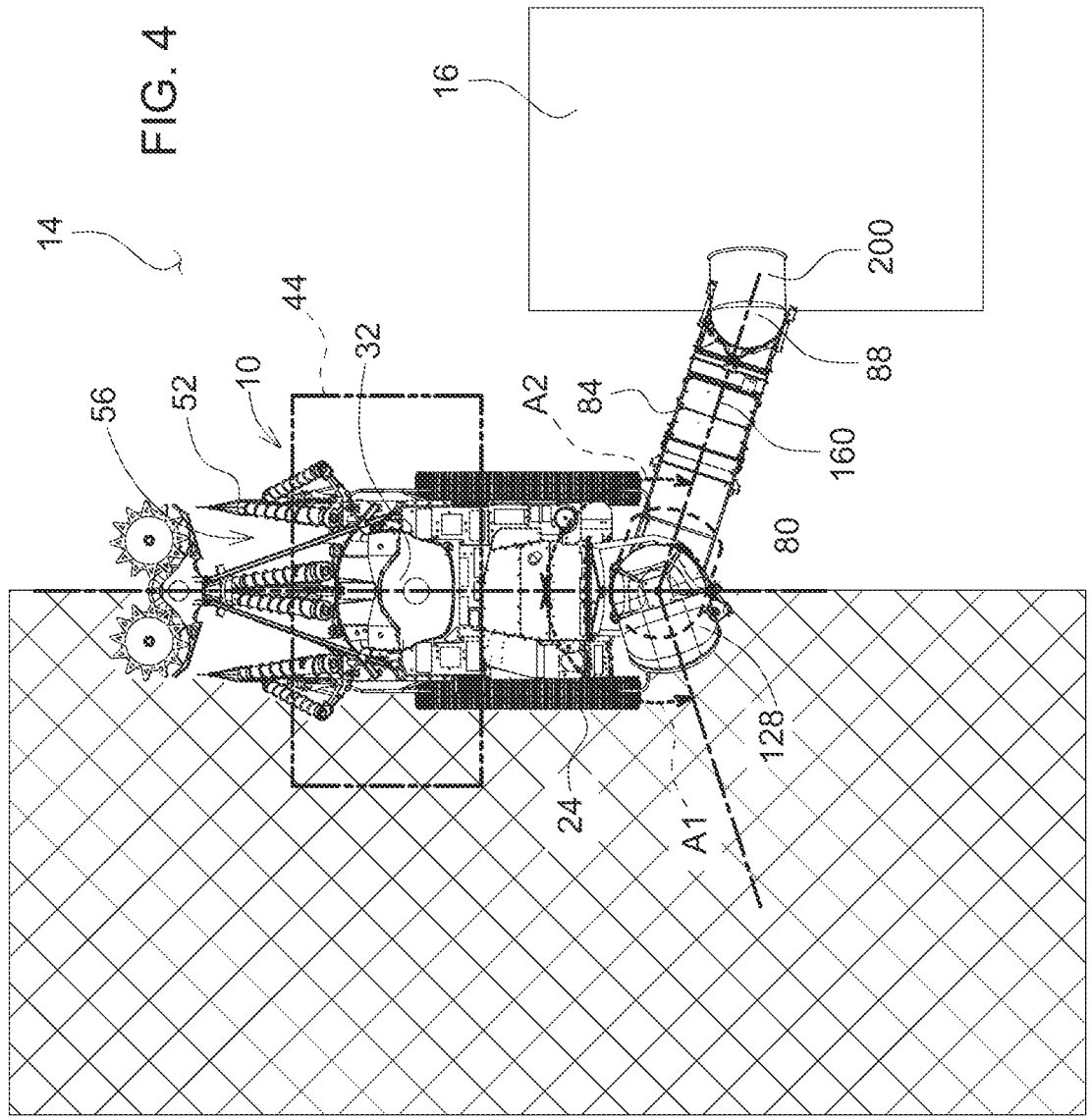
FIG. 4 is a top view of the harvester of FIG. 1.
Figure 5:
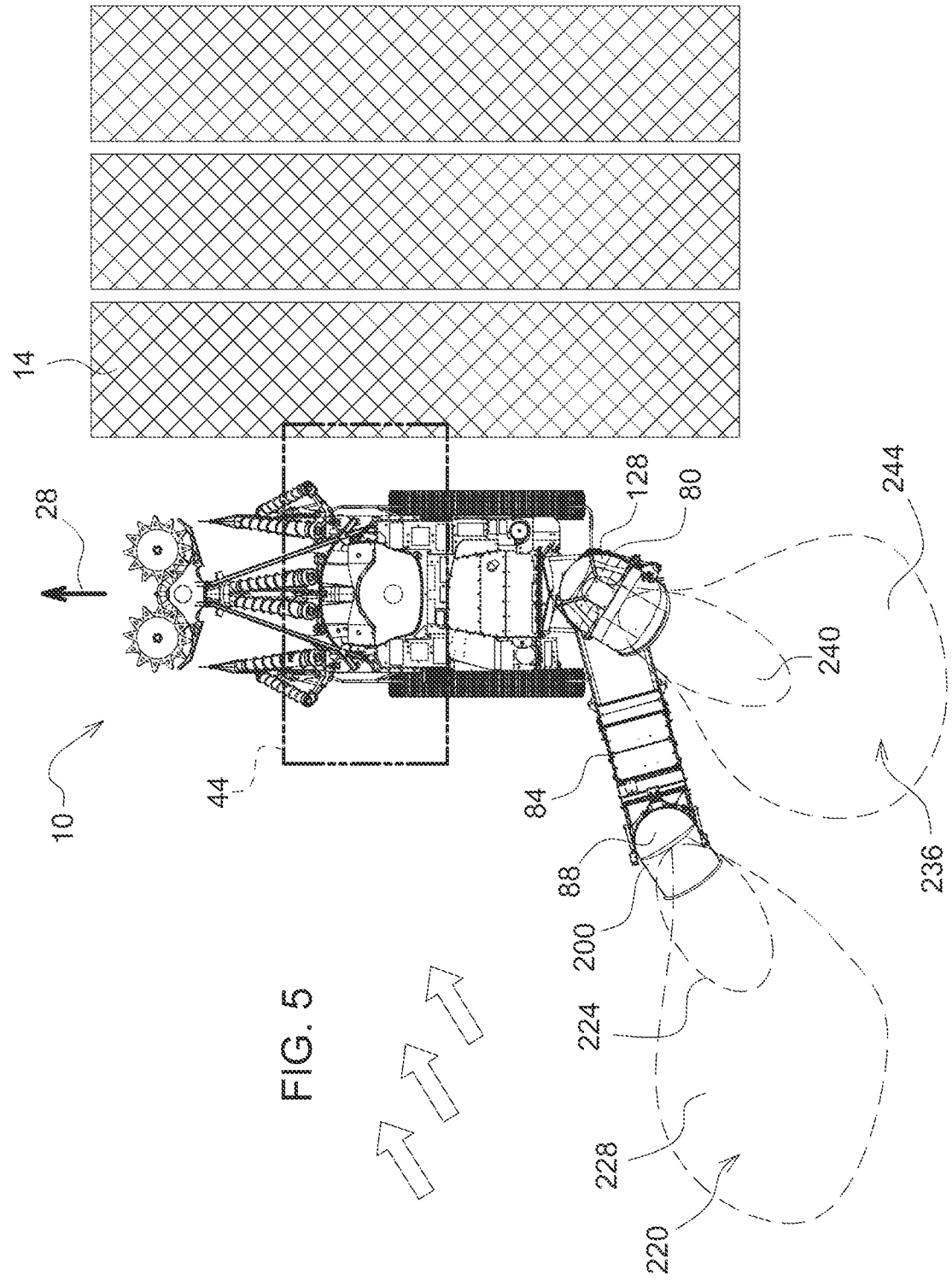
FIG. 5 is a further top view of the harvester of FIG. 1 illustrating a residue profile.

As illustrated in FIGS. 3-5, the primary separator 80 includes a primary hood 128 coupled to the main frame 20. The primary hood 128 may have a domed shape, or other suitable shape, and includes a primary opening 132 (also referred to herein as first outlet) angled out from the harvester 10 and facing slightly down towards the field 14. The hood directs separated extraneous plant matter through the primary opening 132 to the outside of the harvester, back onto the field 14. The separated extraneous plant matter that is directed through the primary opening 132 and ejected back onto the field 14 is referred to as primary residue 136. In some implementations the primary separator 80 includes a primary shredder 140 that shreds the residue into smaller pieces, which can be selectively activated by an operator. The separated crop, including mostly crop billet B, is deposited in a basket 144 disposed below the primary separator 80. The primary hood 128 is rotatably mounted on the frame and rotatable through a range extending from a first position to a second position. In the first position, the primary hood 128 is oriented such that the primary opening 132 is directed at an angle A1 of +161 degrees from the direction of travel 28 of the harvester 10. In the second position, shown in phantom in FIG. 4, the primary hood 128 is oriented such that the primary opening 132 is directed at an angle A2 of −161 degrees (+199 degrees) from the direction of travel 28 of the harvester 10. Thus the primary hood 128 has a range of 38 degrees. The primary hood 128 is infinitely adjustable to a first predetermined angular position, which may include any position from the first position to the second position. In other implementations, the angles A1 and A2 may have any other suitable value such that the primary hood 128 is rotatable within any suitable angular range, such as a range of about 38 degrees (+/−5 degrees), about 50 degrees (+/−5 degrees), about 70 degrees (+/−5 degrees), about 90 degrees (+/−5 degrees), about 120 degrees (+/−5 degrees), about 180 degrees (+/−5 degrees), or more or less than these ranges.

Referring to FIGS. 4-5, the conveyor 84 is coupled to a rear of the frame 20 for receiving the separated crop from the basket 144. The conveyor 84 extends along a conveyor axis 160 (FIG. 4) from the rear of the harvester 10 and terminates at a discharge opening 164 (also referred to herein as a second outlet) elevated to a height suitable for discharging cleaned crop into the vehicle 16. The conveyor 84 is rotatably mounted on the frame 20. The conveyor 84 is rotatable at least from a first position to a second position. In the first position (FIG. 4), the conveyor axis 160 extends at a +98-degree angle from the direction of travel 28 of the harvester. In the second position (FIG. 5), the conveyor axis 160 extends at a −98-degree (+278-degree) angle from the direction of travel 28 of the harvester. Therefore the conveyor 84 has a 164 degree range of motion. The conveyor 84 is infinitely adjustable to a second predetermined angular position, which may include any position from the first position to second position. In other implementations, the conveyor axis 160 may have any other suitable range of motion/angles with respect to the direction of travel 28.

Referring again to FIGS. 3-5, the secondary separator 88 is disposed adjacent the discharge opening 164 for cleaning the crop a second time before being discharged into the vehicle 16. The secondary separator 88 may include a fan, a compressed air source, a rake, a shaker, or other suitable device. In the illustrated implementation, the secondary separator 88 includes a secondary fan 180 driven at a secondary fan speed by a secondary motor 188. The secondary fan speed can be varied by controlling the secondary motor 188. Thus, in the illustrated implementation, the cleaning speed may include the secondary fan speed; however in other implementations, the cleaning speed may include air speed (e.g., of released compressed air or any other pressurized air), rake speed, shaker speed, etc. The secondary separator 88 includes a secondary cleaning chamber 192 defined by a secondary cleaner housing 196. The secondary cleaner housing 196 includes a secondary hood 200 having a secondary opening 204. The secondary hood 200 is rotatably connected to the end of the conveyor 84, such that the secondary hood 200 is rotatable 360 degrees and is infinitely adjustable to a third predetermined angular position, which may include any position in the range of rotation. In other implementations, the secondary hood 200 may have any suitable range of rotation. The secondary crop cleaner is operable such that additional extraneous plant matter is discharged through the secondary opening 204 and the remaining separated crop is discharged through the discharge opening 164 and into the vehicle 16. The additional extraneous plant matter discharged through the secondary opening 204 is referred to as secondary residue 212. In some implementations, the secondary separator 88 includes a secondary shredder 216 that shreds the residue into smaller pieces, which can be selectively activated by the operator.

With reference to FIG. 5, the primary residue 136 is ejected from the primary opening 132 and is dispersed across the field 14. The area covered by the ejected primary residue 136 is approximately represented by a primary residue zone 220. The concentration of the ejected residue may vary within the primary residue zone 220. The primary residue zone 220 includes a first subzone 224 and a second subzone 228. The first subzone 224 covers portions of the primary residue zone 220 having higher concentrations of residue. The second subzone 228 covers portions of the primary residue zone 220 having lower concentrations of residue. The primary separator 80 may eject the primary residue 136 at a primary discharge rate. The secondary residue 212 is ejected from the secondary opening 204 and is dispersed across the field 14. The area covered by the ejected secondary residue 212 is approximately represented by a secondary residue zone 236. The concentration of the ejected secondary residue 212 may vary within the secondary residue zone 236, which includes a third subzone 240 and a fourth subzone 244. The third subzone 240 covers portions of the secondary residue zone 236 having higher concentrations of residue. The fourth subzone 244 covers portions of the secondary residue zone 236 having lower concentrations of residue. The secondary separator 88 may eject the secondary residue 212 at a secondary discharge rate. Once the residue has been ejected from the harvester, ideally, most of the residue ends up on the field 14. It is undesirable for the residue to end up in the vehicle 16 or on the harvester 10 which would then require additional cleaning. In some cases, it is beneficial to spread the residue over a large area in order to increase ease of reincorporating the residue into the field 14. In some cases, it is desirable to concentrate the residue over a small area in order to increase the ease of collecting the residue and transporting somewhere else.

The size, shape, and position of the primary residue zone 220 and the secondary residue zone 236, are dependent on several harvester parameters, including, but not limited to, the first predetermined angular position (also referred to herein as the primary hood orientation), the second predetermined angular position (also referred to herein as the conveyor position), the third predetermined angular position (also referred to herein as the secondary hood orientation), the harvester speed, the direction of travel 28 of the harvester, the primary discharge rate, the secondary discharge rate, and the size and weight of the ejected extraneous plant matter. In some implementations, the primary discharge rate and secondary discharge rate may be quantified as a volume of residue ejected per unit time. In other implementations, the primary and secondary discharge rates could be expressed as any suitable measure of ejected residue. The primary discharge rate may be a function of the primary fan speed as well as the harvester speed, the chopper speed, and/or the feed speed. Similarly, the secondary discharge rate may be a function of the secondary fan speed as well as the harvester speed, the chopper speed, and/or the feed speed.

The harvester 10 includes a harvester sensor network 252 including a plurality of sensors configured to detect a current state of each harvester parameter. For example, the harvester 10 may include a conveyor position sensor 256, a primary hood orientation sensor 260, and a secondary hood orientation sensor 264, configured to detect a current position of the respective component. The harvester 10 may include a harvester speed sensor 268 and a harvester direction sensor 272, such as an onboard navigation system (e.g., a global positioning system receiver, which may include differential correction signals and/or a terrain compensation module) or other suitable sensor. The harvester 10 may use a primary fan speed sensor 276 and a primary motor pressure sensor 280 in addition to the harvester speed sensor 268 to help calculate the primary discharge rate. The harvester 10 may use a secondary fan speed sensor 284 and a secondary motor pressure sensor 288 to help calculate the secondary discharge rate.

In addition to the harvester parameters, the size, shape, and position of the primary residue zone 220 and the secondary residue zone 236 are dependent on environmental parameters, including, but not limited to, wind direction, wind speed, and air humidity. Referring back to FIGS. 1-2, the harvester 10 includes an environmental sensor system 292. In the illustrated implementation, the environmental sensor system 292 is mounted atop the operator's cab 32. In other implementations, the environmental sensor system 292 may be positioned anywhere on the harvester 10 suitable for sensing the environmental parameters. The environmental sensor system 292 is configured to detect a set of environmental conditions of an environment surrounding the harvester. In some implementations, the environmental sensor system 292 may include a weather station. In some implementations, the environmental sensor system 292 may include a series of sensors each configured to sense a different environmental parameter. For example, the environmental sensor system 292 may include a wind speed sensor 344 (e.g., an anemometer which may measure wind speed and/or wind direction), a wind direction sensor 348 (e.g. wind vane), a thermometer 350, a humidity sensor 352, and/or any other instrument or combination of instruments suitable for detecting environmental conditions and any combination of the above. In some implementations, the environmental sensor system 292 may include a communication device that receives information about the environmental conditions from a weather station located elsewhere rather than directly sensing the conditions. In some implementations, the humidity sensor 352 may be disposed in other locations on or within the harvester, such as in the basket 144, or any other suitable location informative of a level of moisture of the crop.

Figure 6:
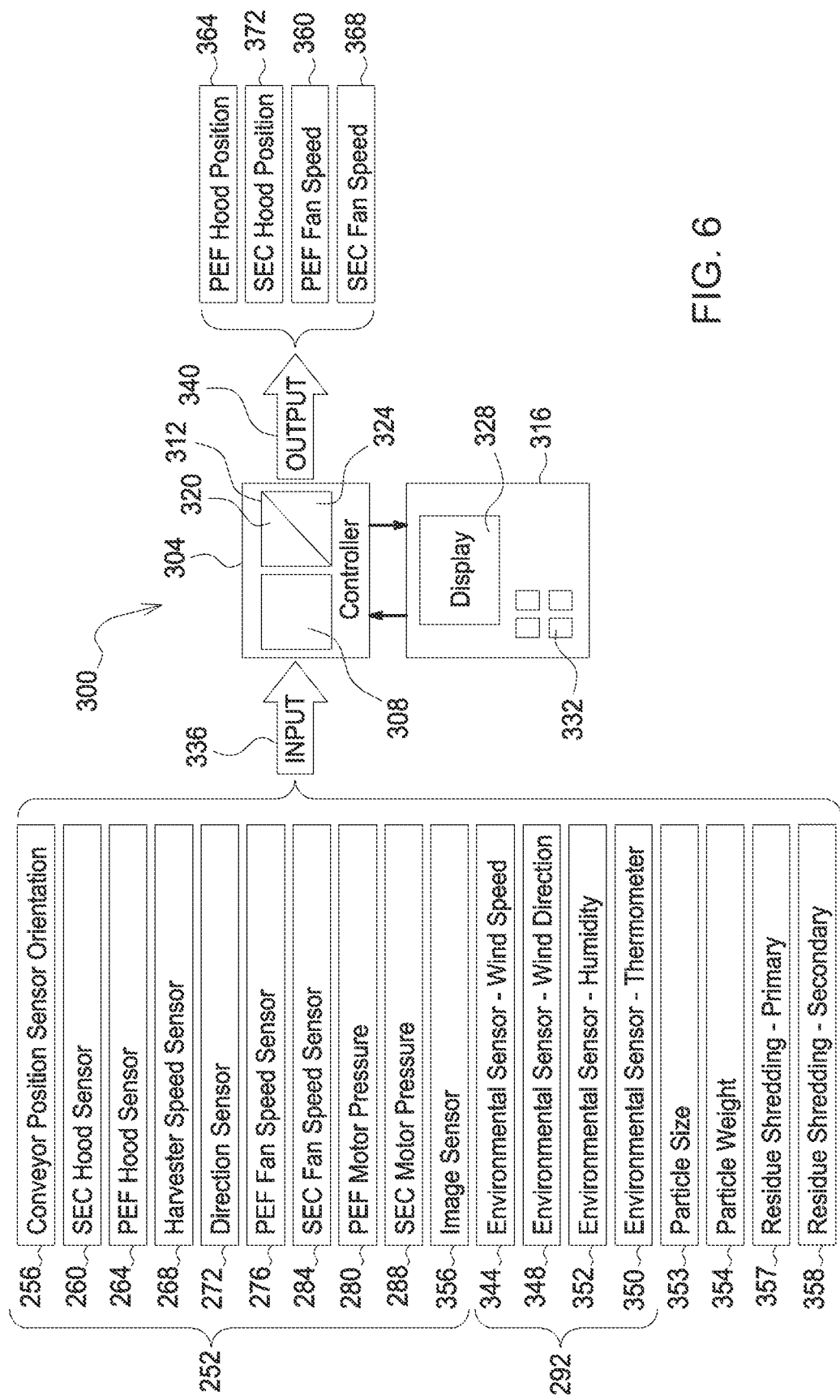
FIG. 6 is a schematic diagram illustrating a control system of the harvester of FIG. 1.

As illustrated in FIG. 6, the harvester 10 includes a control system 300 including a controller 304 having a programmable processor 308 (e.g., a microprocessor, a microcontroller, or another suitable programmable device), a memory 312, and a human-machine interface 316. The memory may include, for example, a program storage area 320 and a data storage area 324. The program storage area 320 and the data storage area 324 can include one type or combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. The control system 300 may include programming, such as algorithms and/or neural networks. The control system 300 may also, or alternatively, include integrated circuits and/or analog devices, e.g., transistors, comparators, operational amplifiers, etc., to execute the logic, algorithms, and control signals described herein.

The human-machine interface 316 may include a display panel 328 and a control panel 332. The display panel 328 may convey visual and/or audio information to an operator. For example, the display panel 328 may include a screen, a touch screen, one or more speakers, etc. The control panel 332 is configured to receive input from the operator. For example, the control panel 332 may include buttons, dials, a touch screen (which may be the same touch screen that provides the display panel or a different touch screen), a personal computer, a mobile device, or the like, with which an operator can input settings, preferences, commands, etc. to control the harvester.

The control system 300 includes a plurality of inputs 336 and outputs 340 to and from various components, as illustrated in FIG. 6. The controller 304 is configured to provide control signals to the outputs and to receive signals (e.g., sensor data signals, user input signals, etc.) from the inputs 336. Signals, as used herein, may include electronic signals (e.g., by circuit or wire), wireless signals (e.g., by satellite, internet, mobile telecommunications technology, a frequency, a wavelength, Bluetooth®), or the like. The inputs 336 may include the harvester sensor network 252 and the environmental sensor system 292. Specifically, the inputs 336 may include, the conveyor position sensor 256, the primary hood orientation sensor 260, the secondary hood orientation sensor 264, the harvester speed sensor 268, the harvester direction sensor 272, the primary fan speed sensor 276, the secondary fan speed sensor 284, the primary motor pressure sensor 280, the secondary motor pressure sensor 288, the wind speed sensor 344, the wind direction sensor 348, the humidity sensor 352, the particle size 353 and particle weight 354 as either inputted by the operator or estimated using the chopper speed and feed speed, and the status 357 of the primary residue shredder 140, and the status 358 of the secondary residue shredder 216. In some implementations, the inputs 336 may also include an image sensor 356, such as a camera mounted on top of the harvester. The camera may be a two-dimensional camera or a three-dimensional camera. The inputs 336 are not limited to those listed and may include other components described herein as well as other components not described herein. The outputs 340 may include an adjustable residue discharge parameter. The adjustable residue discharge parameter may include, but is not limited to, a residue discharge speed, such as a primary fan speed adjustment 360 or a secondary fan speed adjustment 368, or a residue discharge direction, such as a primary hood orientation adjustment 364 or a secondary hood orientation adjustment 372. The outputs 340 may include other components described herein as well as other components not described herein.

The control system 300 is configured to calculate the discharged residue and optimize harvester parameters to meet a set of requirements set by the operator. The discharged residue is generally represented by a residue profile, which is a combination of both the primary residue zone 220 and the secondary residue zone 236. The residue profile may include the area covered by residue and the concentration of residue at each point within the area. The control system 300 is configured to receive the set of requirements from the operator through the human-machine interface 316. In some implementations, the requirements may be specific hood positions, conveyor position, and fan speeds. In some implementations, the requirements may be communicated as part of a mode of operation. For example, the operator may have a choice between three operation modes (which may also be referred to herein as residue management strategies), such as a first mode (or a first residue management strategy), a second mode (or a second residue management strategy), and a third mode (or a third residue management strategy). In other implementations, the operator may have a choice between any number of operation modes, such as two, four, or more. The controller 304 may receive input from the operator corresponding to the desired residue management strategy. Each mode may include a set of mode requirements. The mode requirements may be expressed as areas to keep clear of debris such as residue, directing residue with respect to an area (e.g., size, shape, direction, location, concentration, etc.), or as maximum or minimum operating values.

The first residue management strategy includes keeping residue generally away from a first area, such as the main body of the harvester 10. For example, in the first mode, the control system 300 may generally prioritize machine cleanliness. The mode requirements may be expressed as an area matching a footprint of the harvester 10, where the area is to be avoided, e.g., residue is to be kept generally away.

The second residue management strategy includes keeping residue generally away from a second area, such as the heat exchange area 44. For example, in the second mode, the control system 300 may prioritize keeping residue generally away from the heat exchange area 44, e.g., generally residue free. The mode requirements may be expressed as an area associated with the prime mover 36 and prime mover intake vent that are to be kept generally residue free.

The third residue management strategy includes directing residue with respect to a third area, such as an area of the ground (field 14) around the harvester 10. For example, in the third mode, the operator may indicate an ideal size or shape of the discharged residue defining the third area, or identify the third area as a target location on the field 14 for the discharged residue, or indicate a desired concentration of residue within the third area, or any other parameter with respect to the third area (e.g., residue profile) towards which residue is discharged. The mode requirements may be expressed as a maximum or minimum size of the residue profile or as a maximum or minimum concentration of the residue profile. In some implementations, additional or alternative modes are possible. In some or all the modes, it may be desirable to inhibit residue from landing in or on the vehicle 16 with the cleaned crop billet B. The control system 300 may be configured to calculate an area associated with a footprint of the vehicle 16. The control system 300 may use the image sensor 356 to determine the position of the vehicle 16 or it may be communicated to the control system 300 in other ways.

The control system 300 is configured to estimate the residue profile of the residue discharged by the primary separator 80 and secondary separator 88. The controller 304 is programmed to derive a current residue profile from the inputs 336, including the harvester sensor network 252 and the environmental sensor system 292. The current residue profile includes an estimated primary residue zone 220 and an estimated secondary residue zone 236. In some implementations, the image sensor 356 may be used to confirm the calculated current residue profile.

The control system 300 is configured to calculate and output one or more adjustments given the current residue profile and the mode requirements. The controller 304 is configured to adjust the residue discharge parameter based on the desired residue management strategy and the detected wind speed, wind direction, and/or humidity. The adjustment may be a change in orientation of the primary hood 128 or the secondary hood 200, or it may be a change in the residue discharge rate, e.g., speed of the primary fan 108 or the secondary fan 180 or other related parameter described above. In some implementations, the adjustment may be to other harvester parameters such as the position of the conveyor 84, the harvester speed, the chopper speed, or the feed speed. The control system 300 may be programmed to move the primary hood 128 or the secondary hood 200 to change the residue discharge direction based on the detected wind speed 344, wind direction 348, and/or humidity 352. The control system 300 is configured to further move the primary hood 128 and/or the secondary hood 200 in response to the residue management strategy.

Once the adjustments have been executed, the control system 300 is configured to return to the beginning (see FIG. 7, described in greater detail below). Because the environmental factors like the wind speed and wind direction are constantly changing, the control system 300 is configured to repeat the process indefinitely.

FIG. 7 illustrates a flowchart of an example method 600 for managing residue discharge. As indicated by block 601, the controller 304 is configured to receive the mode requirements from the human-machine interface 316. As indicated by block 602, the controller 304 is configured to receive current inputs 336 including the signals from the sensors in the harvester sensor network 252 and the environmental sensor system 292. As indicated by block 603, the controller 304 is programmed to calculate a current residue profile based on the inputs 336. As indicated by block 604, the controller 304 is programmed to compare the current residue profile to the mode requirements. Based on the comparison, and as indicated in block 605, the controller 304 is configured to adjust one or more system parameters. In some implementations it is desirable to store one or more of the inputs 336, the current residue profile, and the adjustments. In these implementations the method may include an additional step, as indicated by block 606, in which the controller 304 is configured to store the data in the memory 312. The method is configured to repeat indefinitely.

In one example of operation, the user sets the harvester 10 to operate in the first mode, prioritizing harvester cleanliness. The controller 304 receives the inputs 336 including signals from the harvester sensor network 252 and the environmental sensor system 292. The harvester speed is 5 MPH, the harvester direction is North, the conveyor position is +74 degrees from the direction of travel 28, the primary hood orientation is +10 degrees from the direction of travel 28, the secondary hood orientation is +16 degrees relative to conveyor axis 160, the wind speed is 10 MPH, and the wind direction is North East. The controller 304 generates a current residue profile. The current residue profile overlaps the footprint of the harvester. Specifically, the primary residue zone 220 overlaps the rear of the harvester. The controller 304 increases the primary fan speed by 5 percent. The controller 304 recalculates the current residue profile based on updated inputs 336. The primary residue zone 220 no longer overlaps the harvester footprint, so no adjustments are made. The controller 304 continues repeating the process and making any necessary adjustments.

In example of operation, the user sets the harvester 10 to operate in the second mode, prioritizing core cleanliness. The controller 304 receives the inputs 336 including signals from the harvester sensor network 252 and the environmental sensor system 292. The inputs 336 include the harvester speed is 5 MPH, the harvester direction is North, the conveyor position is +74 degrees from the direction of travel 28, the primary hood orientation is +10 degrees from the direction of travel 28, the secondary hood orientation is +16 relative to conveyor axis 160, the wind speed is 10 MPH, and the wind direction is North East. The controller 304 generates a current residue profile. The controller 304 determines that the current profile overlaps the heat exchange area 44. The controller 304 rotates the primary hood 128 clockwise 10 degrees and increases the primary fan speed by 5%. The controller 304 recalculates the current residue profile based on updated inputs 336. The updated profile no longer overlaps the heat exchange area 44, so no adjustments are made. The controller 304 repeats the process and makes adjustments as necessary.

As another example, the user sets the harvester 10 to operate in the third mode, prioritizing an average residue concentration of at least 60%. The controller 304 receives the inputs 336 including signals from the harvester sensor network 252 and the environmental sensor system 292. The inputs 336 include the harvester speed is 5 MPH, the harvester direction is North, the conveyor position is +74 degrees from the direction of travel 28, the primary hood orientation is +10 degrees from the direction of travel 28, the secondary hood orientation is +16 relative to conveyor axis 160, the wind speed is 2 MPH, and the wind direction is North East. The controller 304 generates a current residue profile. The current residue profile has an average concentration of 20%. The controller 304 rotates the secondary hood 200 counterclockwise 10 degrees and decreases the primary fan speed. The controller 304 recalculates the current residue profile based on updated inputs 336. The updated profile has an average concentration of 70%, so no adjustment is made. The controller 304 continues repeating the process and making adjustments as necessary.

In operation, the user inputs a set of requirements or a mode of operation. The stalks of crop are conveyed from the base cutter 64 to the chopper 76. The chopper 76 chops the crop and delivers the stream of crop billet B and extraneous plant matter to the primary cleaning chamber 120. The primary separator 80 separates extraneous plant matter from the crop billet B and ejects primary residue 136 from the primary opening 132. The primary residue 136 settles in the primary residue zone 220. The cleaned crop is deposited in the basket 144, where it is then transported to the secondary separator 88 by the conveyor 84. Additional extraneous matter is separated from the crop billet B and ejected out the secondary opening 204 as secondary residue 212. The secondary residue 212 settles in the secondary residue zone 236. The harvester sensor network 252 and the environmental sensor system 292 capture the desired information and communicate it to the control system 300. The control system 300 analyzes the inputs 336, determines a current residue zone, compares the current residue zone to the set of requirements, and generates the outputs 340. The outputs 340 may include an adjustment to the harvester parameters. The control system 300 may be operable to adjust one or more system parameters of the harvester 10 based on the output 340. After adjusting the parameter, the process may repeat, such that the controller 304 is continuously receiving signals from the sensors and is continuously making adjustments to the system parameter as needed.

Thus, the disclosure provides, among other things, a harvester having a residue management system. Various features and advantages of the disclosure are set forth in the following claims.

What is claimed is:
1. A harvester, comprising:
an inlet configured to receive crop;
a blade configured to cut the crop into billet and extraneous plant matter;
a cleaning system configured to generally distinguish between billet and extraneous plant matter such that billet is directed to a conveyor configured for discharging billet to a vehicle and extraneous plant matter is ejected through a hood as residue, wherein the hood is movable to control a direction of residue ejection;
a sensor configured to detect at least one of wind speed, wind direction, or humidity; and
a control system including a processor, a memory, and a human-machine interface, wherein the control system is configured to receive a signal from the sensor, configured to receive an operator input corresponding to a desired residue management strategy selectable from a plurality of mode options including at least 1) a first residue management strategy in which the control system is programmed to keep residue away from a first area including the harvester to control cleanliness of the harvester and 2) a second residue management strategy in which the control system is programmed to direct residue to a second area including ground around the harvester, wherein the control system is programmed to generate a current residue profile of ejected crop residue, compare the current residue profile with the desired residue management strategy, and move the hood based on the comparison and the detected at least one of wind speed, wind direction, or humidity.

2. The harvester of claim 1, wherein the first area of the harvester includes one or both of 1) a main body of the harvester or 2) a heat exchanger core area of the harvester.

3. The harvester of claim 1, wherein the hood is rotatably mounted.

4. The harvester of claim 1, wherein the control system is configured to provide the plurality of mode options to the operator by way of the human-machine interface.

5. The harvester of claim 1, wherein comparing the current residue profile with the desired residue management strategy includes determining if an area of the current residue profile overlaps the first area including the harvester.

6. The harvester of claim 1, wherein generating the current residue profile includes determining a zone including ejected residue and a concentration of the ejected residue within the zone, and wherein comparing the current residue profile with the desired residue management strategy includes comparing the concentration of residue within the zone to a desired concentration associated with the desired residue management strategy.

7. A harvester, comprising:

an inlet configured to receive crop;

a blade configured to cut the crop into billet and extraneous plant matter;

a cleaning system configured to generally distinguish between billet and extraneous plant matter such that extraneous plant matter is ejected from the harvester as residue and billet is directed to a conveyor configured to discharge billet to a vehicle, wherein a residue discharge rate is adjustable;

a sensor configured to detect at least one of wind speed, wind direction, or humidity; and a control system including a processor, a memory, and a human-machine interface, wherein the control system is configured to receive a signal from the sensor, and configured to receive an operator input corresponding to a residue management strategy, wherein the residue management strategy is selectable from a plurality of mode options including 1) a first residue management strategy in which the control system is programmed to keep residue away from at least a portion of the harvester to control cleanliness of the harvester and 2) a second residue management strategy in which the control system is programmed to direct residue towards an area of ground to control residue spread, wherein the control system is programmed to generate a current residue profile of ejected crop residue, compare the current residue profile with the desired residue management strategy, and adjust the residue discharge rate based on the comparison and the detected at least one of wind speed, wind direction, or humidity.

8. The harvester of claim 7, wherein the residue discharge rate is adjusted as a function of at least one of a speed of the cleaning system, a harvester speed, a chopper speed, or a feed speed.

9. The harvester of claim 7, wherein the portion of the harvester includes one or both of a main body of the harvester or a heat exchanger core area of the harvester.

10. The harvester of claim 7, wherein the control system is configured to provide the plurality of mode options to the operator by way of the human-machine interface.

11. The harvester of claim 7, wherein comparing the current residue profile with the desired residue management strategy includes determining if an overlap between an area of the current residue profile and the portion of the harvester exists.

* * * * *